(12) United States Patent
Okada et al.

(10) Patent No.: US 10,908,527 B2
(45) Date of Patent: Feb. 2, 2021

(54) IMAGE FORMING APPARATUS

(71) Applicant: CANON KABUSHIKI KAISHA, Tokyo (JP)

(72) Inventors: Yuta Okada, Moriya (JP); Yasuaki Otoguro, Abiko (JP); Yuichiro Imai, Tokyo (JP); Toshiki Momoka, Tokyo (JP); Yoshitaka Otsubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/697,673

(22) Filed: Nov. 27, 2019

(65) Prior Publication Data

US 2020/0174396 A1 Jun. 4, 2020

(30) Foreign Application Priority Data

Dec. 4, 2018 (JP) ................................. 2018-227618

(51) Int. Cl.
*G03G 15/04* (2006.01)
*G02B 5/08* (2006.01)
*G03G 21/00* (2006.01)

(52) U.S. Cl.
CPC ......... *G03G 15/04072* (2013.01); *G02B 5/08* (2013.01); *G03G 21/007* (2013.01)

(58) Field of Classification Search
CPC .......... G03G 21/007; G03G 15/04045–04072; G03G 2215/0897; B08B 1/008
See application file for complete search history.

(56) References Cited

U.S. PATENT DOCUMENTS

| 7,522,326 | B1 | 4/2009 | Otoguro | 347/256 |
| 7,684,099 | B2 | 3/2010 | Otoguro | 359/216.1 |
| 8,810,622 | B2 | 8/2014 | Mamiya et al. | 347/242 |
| 8,917,305 | B2 | 12/2014 | Nakahata et al. | 347/244 |
| 8,947,478 | B2 | 2/2015 | Ishidate et al. | 347/137 |
| 9,086,645 | B2 | 7/2015 | Otoguro et al. | G03G 15/0435 |
| 9,195,063 | B2 | 11/2015 | Ishidate et al. | G03G 15/04072 |
| 9,316,992 | B2 | 4/2016 | Ishidate et al. | G03G 15/80 |
| 9,400,444 | B2 | 7/2016 | Sato et al. | G03G 15/043 |

(Continued)

FOREIGN PATENT DOCUMENTS

JP 2016-031466 3/2016

*Primary Examiner* — Sevan A Aydin
(74) *Attorney, Agent, or Firm* — Venable LLP

(57) ABSTRACT

Disclosed is an image forming apparatus, including an optical scanning device, wherein the optical scanning device includes:

a holding member configured to integrally hold a first cleaning member and a second cleaning member;

a first guide member configured to guide a movement of the holding member;

a second guide member configured to guide a movement of the holding member;

a first groove portion;

a second groove portion, and wherein when the holding member moves from end portions of the first guide portion and the second guide portion to an opposite side with respect to a central portion side and a first engaging portion and a second engaging portion of the holding member respectively pass in the first groove portion and the second groove portion, engagements of the first engaging portion and the second engaging portion with the first guide portion and the second guide portion are released.

6 Claims, 13 Drawing Sheets

(56) References Cited

U.S. PATENT DOCUMENTS

| | | | |
|---|---|---|---|
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,906,663 B2 | 2/2018 | Otsubo | G03G 15/04045 |
| 9,927,732 B2 | 3/2018 | Otsubo | G03G 15/04045 |
| 10,061,119 B2 | 8/2018 | Ogura et al. | G02B 7/181 |
| 10,185,119 B2 | 1/2019 | Ishidate et al. | G02B 7/1821 |
| 10,274,860 B2 | 4/2019 | Otoguro et al. | G03G 15/04072 |
| 10,303,080 B2 | 5/2019 | Ishidate et al. | B41J 2/47 |
| 10,303,081 B2 | 5/2019 | Ishidate et al. | G03G 15/04036 |
| 10,324,396 B2 | 6/2019 | Imai et al. | G02B 26/12 |
| 10,367,964 B2* | 7/2019 | Tomioka | H04N 1/00909 |
| 10,389,897 B2 | 8/2019 | Imai | G02B 26/127 |
| 10,451,870 B2 | 10/2019 | Okada et al. | G02B 26/121 |
| 10,473,922 B2 | 11/2019 | Aruga et al. | G02B 26/121 |
| 10,484,566 B2 | 11/2019 | Namba et al. | G02B 26/123 |
| 10,498,920 B2 | 12/2019 | Okada et al. | H04N 1/00649 |
| 10,520,851 B2 | 12/2019 | Aruga et al. | G03G 15/0435 |
| 10,558,140 B2 | 2/2020 | Okada et al. | G02B 7/182 |
| 10,739,694 B2* | 8/2020 | Kamata | G03G 21/02 |
| 10,739,718 B2* | 8/2020 | Suzuki | G03G 21/0005 |
| 2009/0148173 A1* | 6/2009 | Tajima | G03G 21/00 399/36 |
| 2014/0112676 A1* | 4/2014 | Mori | G03G 15/55 399/49 |
| 2014/0119768 A1* | 5/2014 | Yuki | G03G 21/1666 399/98 |
| 2014/0334840 A1* | 11/2014 | Mizuno | F16H 1/04 399/98 |
| 2015/0002914 A1* | 1/2015 | Takahashi | G03G 21/1666 358/484 |
| 2016/0033890 A1* | 2/2016 | Sumikura | G03G 15/04 347/118 |
| 2016/0033923 A1 | 2/2016 | Sumikura et al. | G03G 21/0005 |
| 2017/0064108 A1 | 3/2017 | Mamiya et al. | H04N 1/00525 |
| 2017/0277113 A1* | 9/2017 | Mimura | G03G 21/007 |
| 2017/0371269 A1* | 12/2017 | Mimura | G03G 21/00 |
| 2018/0231768 A1 | 8/2018 | Nakahata et al. | G02B 26/123 |
| 2018/0314183 A1* | 11/2018 | Tsujioka | G03G 21/1666 |
| 2020/0073277 A1 | 3/2020 | Ogura et al. | G03G 15/04072 |
| 2020/0096931 A1 | 3/2020 | Seki | G03G 15/505 |
| 2020/0278638 A1* | 9/2020 | Takezawa | G03G 15/5054 |

* cited by examiner

IMAGE FORMING APPARATUS

BACKGROUND OF THE INVENTION

Field of the Invention

The present invention relates to an image forming apparatus such as an electro-photographic copying machine or a laser beam printer that forms an image on a recording medium using an electro-photographic process.

Description of the Related Art

In an electro-photographic image forming apparatus, an optical scanning device (optical scanning unit) that scans a charged photosensitive body with a laser beam to form an electrostatic latent image is mounted. Further, an opening for allowing laser light to pass through is formed on the housing of the optical scanning device. This opening is closed by a transmissive member that transmits laser light in order to prevent foreign matters such as toner and dust from entering the optical scanning device.

When a foreign matter exists on the surface of the transmissive member, some of the laser light passing through the transmissive member is blocked by this foreign matter, so that the optical characteristics may be deteriorated and the image quality may be lowered. In order to overcome this problem, Japanese Patent Application Laid-Open No. 2016-31466 discloses a configuration in which a foreign matter on the surface of the transmissive member is removed by a cleaning member such as a pad or a blade that is moved while being in contact with or pressed against the transmissive member in a way similar to a wiper. The cleaning member disclosed in Japanese Patent Application Laid-Open No. 2016-31466 is held by a cleaning holder, and the cleaning holder is fixed to a wire. The cleaning holder moves by the wire that is moved by a motor, and the cleaning member cleans the transmissive member as the cleaning holder moves. The cleaning holder is engaged with a guide rail provided in the vicinity of the transmissive member and moves along the guide rail.

When the cleaning member is used for a long period of time, the cleaning member itself is contaminated, and there is a possibility that the transmission member is more contaminated when the cleaning operation is performed. For this reason, it is desirable to periodically replace the cleaning member. Therefore, it is preferable that an operator can easily replace the cleaning member, and in particular, it is desired that the cleaning holder has such a shape that the cleaning holder can be easily detached from the guide rail.

Accordingly, the present invention has been made in view of the above, and an object thereof is to provide an image forming apparatus capable of improving the exchangeability of the cleaning member.

SUMMARY OF THE INVENTION

A representative configuration of the present invention is an image forming apparatus, comprising:
 a first photosensitive body;
 a second photosensitive body;
 a first developing portion configured to develop an electrostatic latent image formed on the first photosensitive body with toner;
 a second developing portion configured to develop an electrostatic latent image formed on the second photosensitive body with toner; and
 an optical scanning device disposed below the first photosensitive body, the second photosensitive body, the first developing portion and the second developing portion in a vertical direction,
 wherein the optical scanning device comprises:
 a rotary polygon mirror configured to deflect a first laser beam and a second laser beam such that the first laser beam scans the first photosensitive body and second laser beam scans the second photosensitive body;
 a housing in which the rotary polygon mirror is accommodated, a first opening portion through which the first laser beam passes from an inside of the housing to an outside of the housing and a second opening portion through which the second laser beam passes from the inside of the housing to the outside of the housing being formed on the housing, the first opening portion being configured to be long in a scanning direction of the first laser beam, the second opening portion being configured to be long in a scanning direction of the second laser beam;
 a first transmissive member through which the first laser beam transmits, the first transmissive member being configured to close the first opening portion;
 a second transmissive member through which the second laser beam transmits, the second transmissive member being configured to close the second opening portion;
 a first cleaning member configured to be in contact with a surface of the first transmissive member which surface faces the outside of the housing in order to clean the surface of the first transmissive member;
 a second cleaning member configured to be in contact with a surface of the second transmissive member which surface faces the outside of the housing in order to clean the surface of the second transmissive member;
 a holding member configured to integrally hold the first cleaning member and the second cleaning member;
 a moving unit configured to move the holding member such that the first cleaning member and the second cleaning member move in a first direction that is a longitudinal direction of the first transmissive member and the second transmissive member;
 a first guide portion configured to guide a movement of the holding member, the first guide portion extending in the first direction, a first engaging portion provided on an end portion side of the holding member in a second direction that crosses the first direction and the vertical direction being configured to engage with the first guide portion;
 a second guide portion configured to guide a movement of the holding member, the second guide portion extending in the first direction, a second engaging portion provided on another end portion side of the holding member in the second direction being configured to engage with the second guide portion;
 a first groove portion in which the first engaging portion passes when the holding member moves, the first groove portion being provided blow the first guide portion and extending in the first direction, a length of the first groove portion being larger than that of the first guide portion in the first direction;
 a second groove portion in which the second engaging portion passes when the holding member moves, the second groove portion being provided blow the second guide portion and extending in the first direction, a length of the second groove portion being larger than that of the second guide portion in the first direction, and wherein when the holding member moves from end portions of the first guide portion and the second guide portion in the first direction to an opposite side with respect to a central portion side in the first direction and the first engaging portion and the second engaging portion respectively pass in the first groove portion and the second groove portion, engagements of the first engaging portion and the second engaging portion with the first guide portion and the second guide portion are released.

Further features of the present invention will become apparent from the following description of exemplary embodiments with reference to the attached drawings.

DESCRIPTION OF THE EMBODIMENTS

First Embodiment

<Image Forming Apparatus>

First, the overall configuration of the image forming apparatus according to the first embodiment of the present invention will be described together with the operation during image formation with reference to the drawings. It should be noted that the dimensions, materials, shapes, relative arrangements, and the like of the components described below are not intended to limit the scope of the present invention only to those unless otherwise specified.

The image forming apparatus A according to the present embodiment is a full-color laser printer in which toners of four colors, yellow Y, magenta M, cyan C, and black K are transferred onto an intermediate transfer belt, and then the toners of four colors on the intermediate transfer belt are transferred to a sheet to form an image. In the following description, the members using the toners of the respective colors are given the suffixes Y, M, C, and K. However, these suffixes are appropriately omitted unless the distinction between them is necessary since the configuration and operation of each member is substantially the same except for the colors of the used toners.

Figure 1:
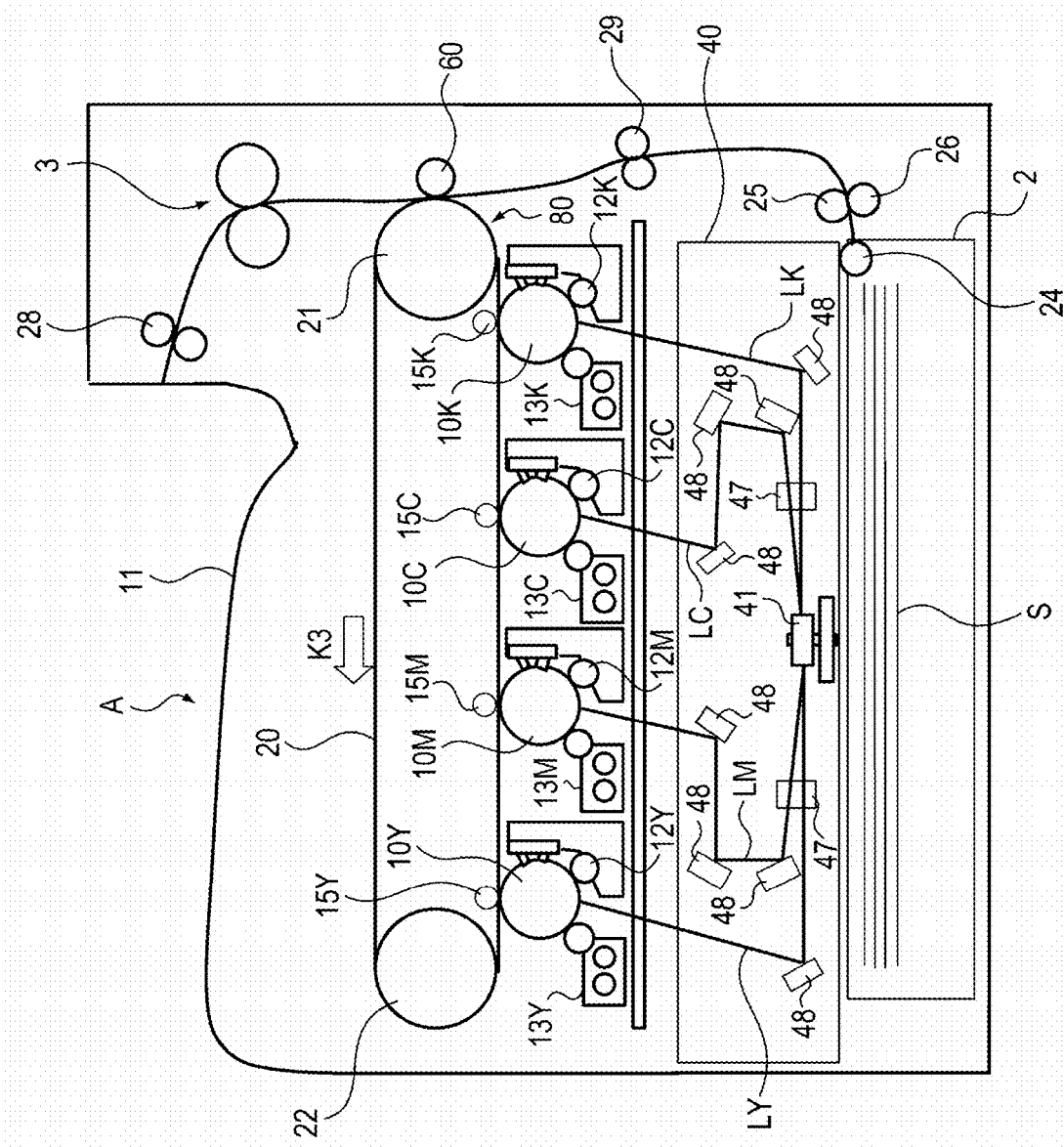
FIG. 1 is a schematic cross-sectional view of an image forming apparatus.

As shown in FIG. 1, the image forming apparatus A includes an image forming portion that transfers a toner image onto a sheet to form an image, a sheet feeding portion that supplies the sheet to the image forming portion, and a fixing portion that fixes a toner image on the sheet.

The image forming portion includes the photosensitive drums 10 (10Y, 10M, 10C and 10K) that are photosensitive members, the charging rollers 12 (12Y, 12M, 12C and 12K) that charge the surface of the photosensitive drums 10, and the developing devices 13 (13Y, 13M, 13C and 13K). The image forming portion further includes the primary transfer rollers 15 (15Y, 15M, 15C and 15K), the optical scanning device 40, and the intermediate transfer unit 80.

The intermediate transfer unit 80 includes the intermediate transfer belt 20, the secondary transfer roller 60, the belt driving rollers 21 and 22, and the like. The intermediate transfer belt 20 is an endless belt stretched around the belt driving rollers 21 and 22, and rotates in the direction of the arrow K3 as the belt driving rollers 21 and 22 rotate.

The optical scanning device 40 (optical scanning unit) is disposed below the photosensitive drums 10 and the developing devices 13 in the vertical direction. The optical scanning device 40 includes the light source portion 43 (see FIGS. 2 and 3) having four semiconductor lasers (not shown) as light sources that emit laser beams L (LY, LM, LC and LK) modulated in accordance with image information of respective colors (see FIG. 4). The optical scanning device 40 has the rotary polygon mirror 41 as a deflection device. The rotary polygon mirror 41 deflects the laser beams of colors so that the laser beams corresponding to respective colors emitted from the light sources respectively scan on the corresponding photosensitive drums 10.

In the optical scanning device 40, the laser beams L deflected by the rotary polygon mirror 41 are guided by the scanning lenses 47 and the mirrors 48 provided in the optical scanning device 40 so that the laser beams L travel along predetermined paths. Then, the laser beams L that have traveled along the predetermined paths pass through the irradiation openings 42 provided in the upper part of the optical scanning device 40 and are irradiated onto the photosensitive drums 10. That is, the respective laser beams L are deflected by the rotary polygon mirror 41 and guided to the corresponding photosensitive drums 10 by the scanning lenses 47 and the mirrors 48. The laser beams L respectively scan the photosensitive drums 10 along the rotational axis direction of the photosensitive drums 10. The optical scanning device 40 scans the surfaces of the photosensitive drums 10 in the main scanning direction with the laser beams L whose deflection angles are changed by the rotation of the rotary polygon mirror 41.

Next, an image forming operation will be described. First, when the control portion (not shown) receives an image forming job signal, the sheets S stacked and stored in the sheet stacking unit 2 are separated into one sheet by the retard roller 26 and conveyed to the registration roller 29 by the feeding roller 24 and the transporting roller 25. Next, after the timing correction for the sheet S is performed by the registration roller 29, the sheet S is conveyed to the secondary transfer portion configured by the secondary transfer roller 60 and the belt driving roller 21.

On the other hand, in the image forming portion, the surface of the photosensitive drum 10Y is firstly charged by the charging roller 12Y. Thereafter, the optical scanning device 40 irradiates the surface of the photosensitive drum 10Y with the laser beam LY in accordance with an image signal transmitted from an external device (not shown) or the like, thereby forming an electrostatic latent image on the surface of the photosensitive drum 10Y.

Thereafter, yellow toner is attached to the electrostatic latent image formed on the surface of the photosensitive drum 10Y by the developing device 13Y to form a yellow toner image on the surface of the photosensitive drum 10Y. The toner image formed on the surface of the photosensitive drum 10Y is primarily transferred to the intermediate transfer belt 20 by applying a primary transfer bias to the primary transfer roller 15Y.

Through similar processes, magenta, cyan, and black toner images are also formed on the photosensitive drums 10M, 10C, and 10K, respectively. Then, by applying a primary transfer bias to the primary transfer rollers 15M, 15C, and 15K, these toner images are transferred onto the intermediate transfer belt 20 in a superimposed manner with the yellow toner image. As a result, a full-color toner image is formed on the surface of the intermediate transfer belt 20.

Thereafter, this full-color toner image is conveyed to the secondary transfer unit by the rotation of the intermediate transfer belt 20. Then, in the secondary transfer portion, a secondary transfer bias is applied to the secondary transfer roller 60, so that the full-color toner image on the intermediate transfer belt 20 is transferred to the sheet S.

Next, the sheet S to which the toner image has been transferred is heated and pressed in the fixing device 3, so that the toner image on the sheet S is fixed to the sheet S. Thereafter, the sheet S on which the toner image has been fixed is discharged to the discharge portion 11 by the discharge roller 28.

When the photosensitive drum 10Y is referred to as a first photosensitive body, any one of the photosensitive drums 10M, 10C, and 10K is referred to as a second photosensitive body. When the photosensitive drum 10M is referred to as a first photosensitive body, any one of the photosensitive drums 10Y, 10C, and 10K is referred to as a second photosensitive body. That is, when one of the photosensitive drums 10Y, 10M, 10C, and 10K is referred to as a first photosensitive body, any one of the other photosensitive drums is referred to as a second photosensitive body. Similarly, when the developing device 13Y is referred to as a first developing portion, any one of the developing devices 13M, 13C, and 13K is referred to as a second developing portion. That is, when one of the developing devices 13Y, 13M, 13C, and 13K is referred to as a first developing portion, any one of the other developing devices is referred to as a second developing portion.

<Optical Scanning Device>

Next, the configuration of the optical scanning device 40 will be described.

Figure 2:
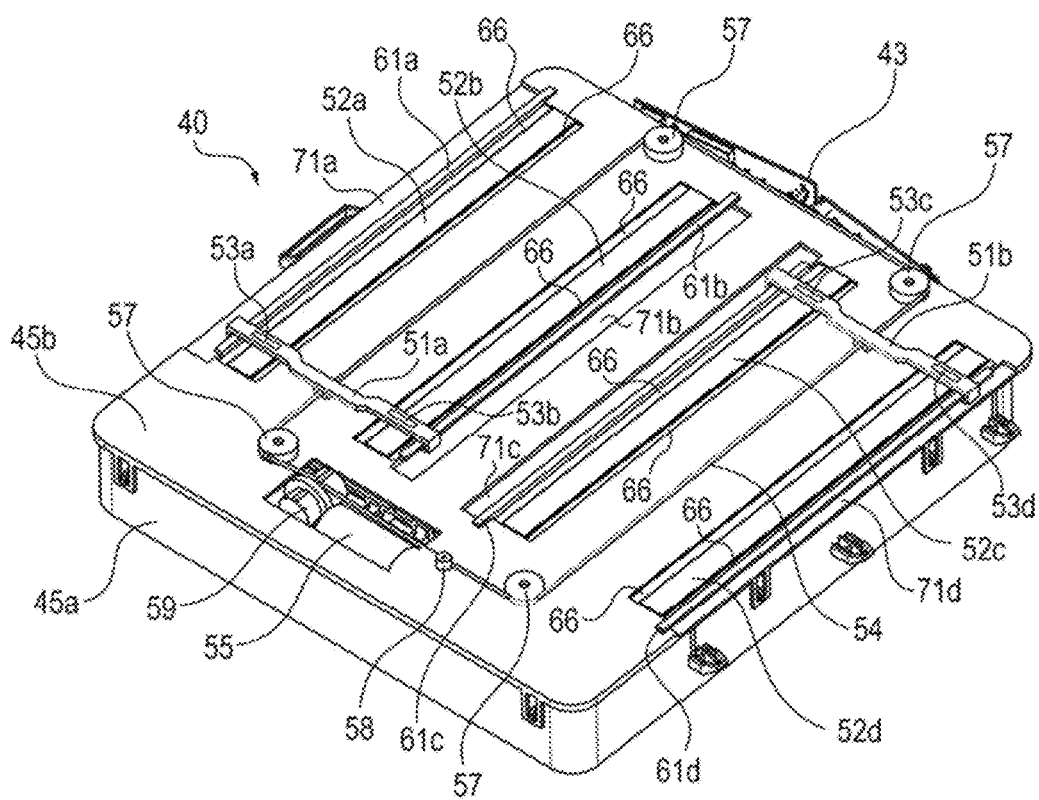
FIG. 2 is a perspective view of an optical scanning device.
Figure 3:
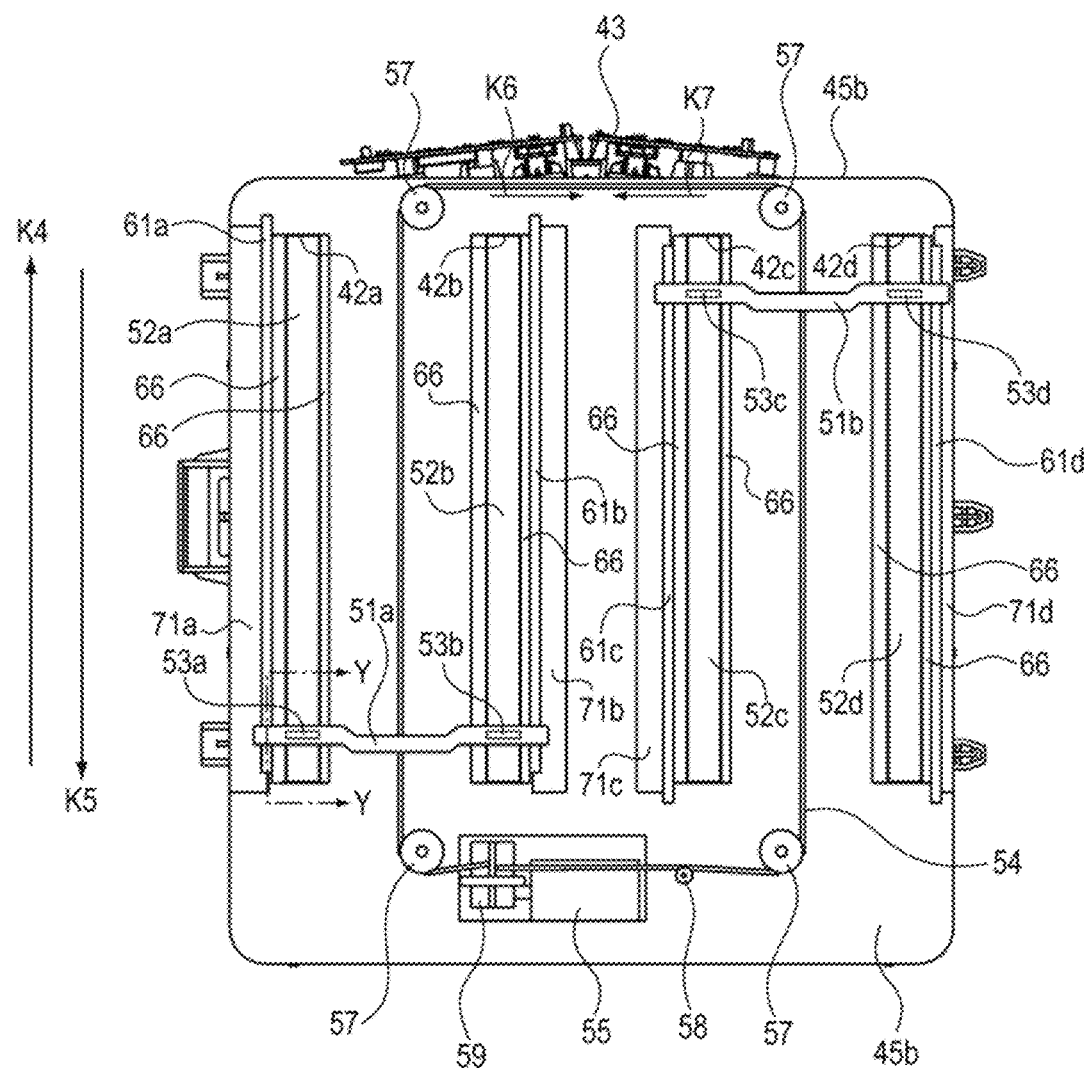
FIG. 3 is a top view of the optical scanning device.

FIGS. 2 and 3 are a perspective view and a top view of the optical scanning device 40, respectively. As shown in FIGS. 2 and 3, the optical scanning device 40 includes the optical box 45a whose top is opened, and the cover 45b that covers the open top of the optical box 45a. The optical box 45a and the cover 45b serve as a housing in which optical members such as the rotary polygon mirror 41 and the scanning lenses 47 are housed. A substantially hermetically sealed space is formed by the optical box 45a and the cover 45b. The rotary polygon mirror 41, the scanning lenses 47, and the mirrors 48 are disposed in this hermetically sealed space. As a result, the reflecting surface of the rotary polygon mirror 41, the scanning lenses 47, and the mirrors 48 are protected from dust including scattered toner outside the optical scanning device 40.

The irradiation openings 42 (42a to 42d) are opening portions (openings for laser passage) formed on the cover 45b (a part of the housing) through which the laser beams L pass from the inside of the optical box (hermetically sealed space side of the optical scanning device 40) to the outside of the optical box. The laser beams L are emitted from semiconductor lasers (not shown) that are light sources and scan the photosensitive drums 10. Here, the irradiation opening 42 through which the laser beam L that scans the first photosensitive body is referred to as a first opening portion, and the irradiation opening 42 through which the laser beam L which scans the second photosensitive body is referred to as a second opening portion.

As shown in FIG. 3, the irradiation openings 42 are separately provided for respective colors. The irradiation openings 42 have a rectangular shape whose longitudinal direction is the main scanning direction of the laser beams L deflected by the rotary polygon mirror 41. The irradiation openings 42 are formed so that the longitudinal directions thereof are parallel to each other. The shape of the irradiation openings 42 is not limited to this as long as the laser beams L can pass through the irradiation openings.

In addition, the irradiation openings 42 respectively have four transmissive members 52 (52a to 52d) that close them from the outside of the cover 45b in order to prevent foreign matter such as toner and dust from entering the inside of the housing of the optical scanning device 40. Here, the transmissive member 52 that closes the first opening portion described above is referred to as a first transmissive member, and the transmissive member 52 that closes the second opening portion is referred to as a second transmissive member.

The transmissive member 52 has transmission property by which the laser beam L emitted from a semiconductor laser (not shown) transmits through the transmissive member 52 and the laser beam produced by a semiconductor laser may be emitted to the photosensitive drums 10. In the present embodiment, the outer side of the transmissive member 52 with respect to the optical scanning device 40 is a light-emitting surface, and the inner side with respect to the optical scanning device 40 is a light incident surface. The transmissive member 52 has a rectangular shape whose longitude direction is the main scanning direction of the laser beam L deflected by the rotary polygon mirror 41. The transmitting member 52 is, for example, a glass cover, but may be made of plastic or the like as long as the laser beam may transmit through the material.

As described above, the optical scanning device 40 is configured to prevent foreign matters such as toner, paper powder, and dust from entering the optical scanning device 40 by being covered with the cover 45b and the transmissive member 52. Further, by fixing the transmissive member 52 larger than the irradiation opening 42 on the cover 45b, foreign matters such as toner, paper powder, and dust falling from above the optical scanning device 40 are prevented from entering the inside of the optical scanning device 40 via the gap between the transmission member 52 and irradiation opening 42.

The optical scanning device 40 is provided with two cleaning holders 51 (51a, 51b) as holding members, which are mainly made of POM (polyacetal resin) and have flexibility. The cleaning holder 51a engages with guide rails 61a and 61b formed on the cover 45b, and extends so as to straddle the two adjacent transmissive members 52a and 52b. The cleaning holder 51b engages with guide rails 61c and 61d formed on the cover 45b, and extends so as to straddle two adjacent transmissive members 52c and 52d. The guide rails 61 extend along the longitudinal direction of the transmissive members 52 and guide the movement of the cleaning holders 51.

That is, the longitudinal direction (second direction) of the cleaning holder 51 is a direction orthogonal to the longitudinal direction (first direction) of the transmissive member 52 and the vertical direction. The widthwise direction of the cleaning holder 51 is the same as the longitudinal direction of the transmissive member 52. The longitudinal direction of the transmissive member 52 is the same as the main scanning direction of the laser beam L deflected by the rotary polygon mirror 41.

The cleaning holder 51 is connected to the wire 54. In other words, the cleaning holder 51 holds the wire 54. The wire 54 is annularly stretched by four tension pulleys 57 that are rotatably held by the cover 45b, the tension adjustment pulley 58, and the wire winding portion 59. Specifically, the wire 54 is stretched so as to be parallel to the longitudinal direction of the transmissive members 52 at positions between two adjacent transmission members 52.

The wire 54 annually travels by the driving force of the motor 55. The wire 54 is wound and adjusted in length by the wire winding portion 59 that is rotated by the driving force of the motor 55. As described above, the wire 54 is stretched by the tension pulleys 57, the tension adjustment pulley 58, and the wire winding portion 59, so that the tension of the wire 54 can be stabilized and the wire 54 may smoothly travel in an annular shape.

Further, as the wire 54 travels, the cleaning holder 51 moves in the longitudinal direction of the transmissive member 52 (the direction of the arrow K4 or the direction of the arrow K5 shown in FIG. 3). That is, the wire winding portion 59 driven by the driving force of the motor 55 and the wire 54 constitute a moving unit that moves the cleaning holder 51.

The cleaning holders 51a and 51b integrally hold two cleaning members 53 (53a to 53d) such that the connecting portion with the wire is located between two cleaning members 53. The cleaning member 53 is a rectangular rubber pad made of silicon rubber, and is disposed so as to be in contact with and pressed by the transmissive member 52. The materials of the cleaning holder 51 and the cleaning member 53 are not limited to these.

As the cleaning holder 51 moves, the cleaning member 53 moves in the longitudinal direction of the transmission member 52 (the direction of the arrow K4 or the arrow K5 shown in FIG. 3), namely along the scanning direction of the laser beam L deflected by the rotating polygon mirror 41 while the cleaning member 53 is in contact with the surface of the transmission member 52 on the outside of the cover 45b. That is, the moving direction of the cleaning member 53 is the same as the rotation axis direction of the photosensitive drum 10 and the direction of the scanning with the laser beam L deflected by the rotary polygon mirror 41. As a result, the cleaning member 53 scrapes and removes the adhering matter that has adhered to the surface of the transmissive member 52 and the foreign matter that has fallen on the surface of the transmitting member 52, thereby suppressing the laser beam L from being unintentionally blocked by the foreign matters.

The cover 45b is formed with the catch groove 66 that collects and holds the foreign matters removed by the cleaning member 53 at a position adjacent to the transmissive member 52 in the direction orthogonal to the moving direction of the cleaning member 53. The catch groove 66 is a groove formed below the surface of the transmissive member 52 in the thickness direction of the transmissive member 52.

<Cleaning Holder>

Next, the configuration of the cleaning holder 51 will be described in detail.

Figure 4:
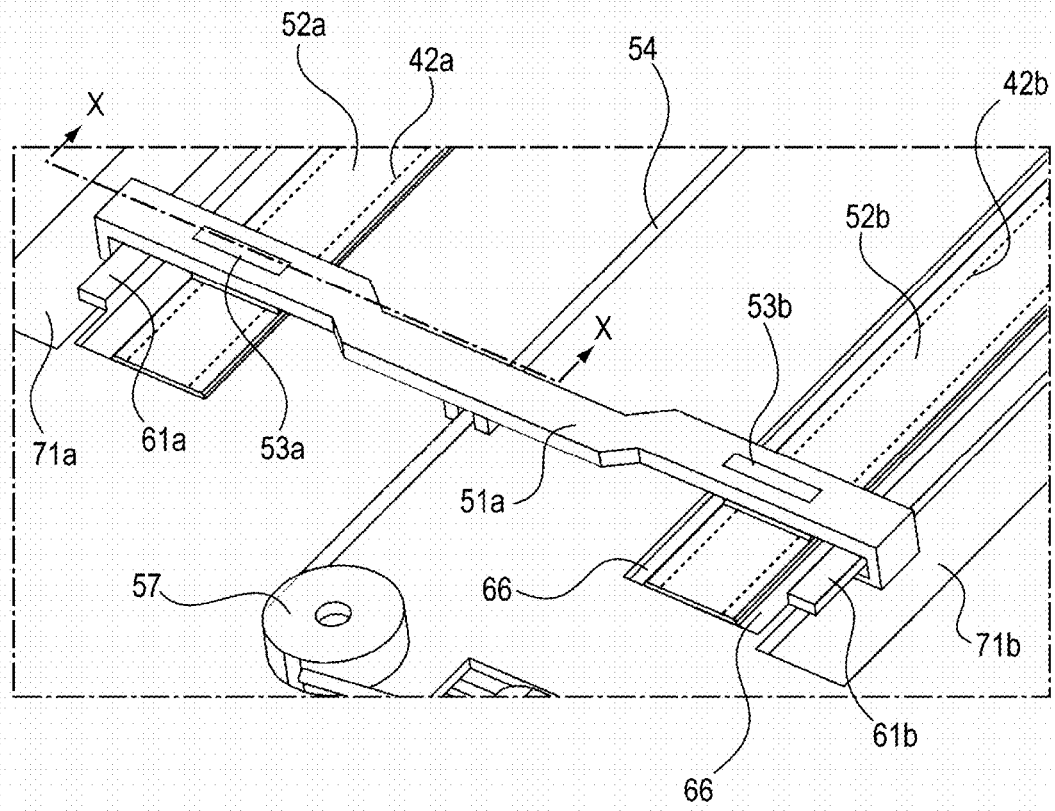
FIG. 4 is an enlarged perspective view of the periphery of a cleaning holder.
Figure 5:
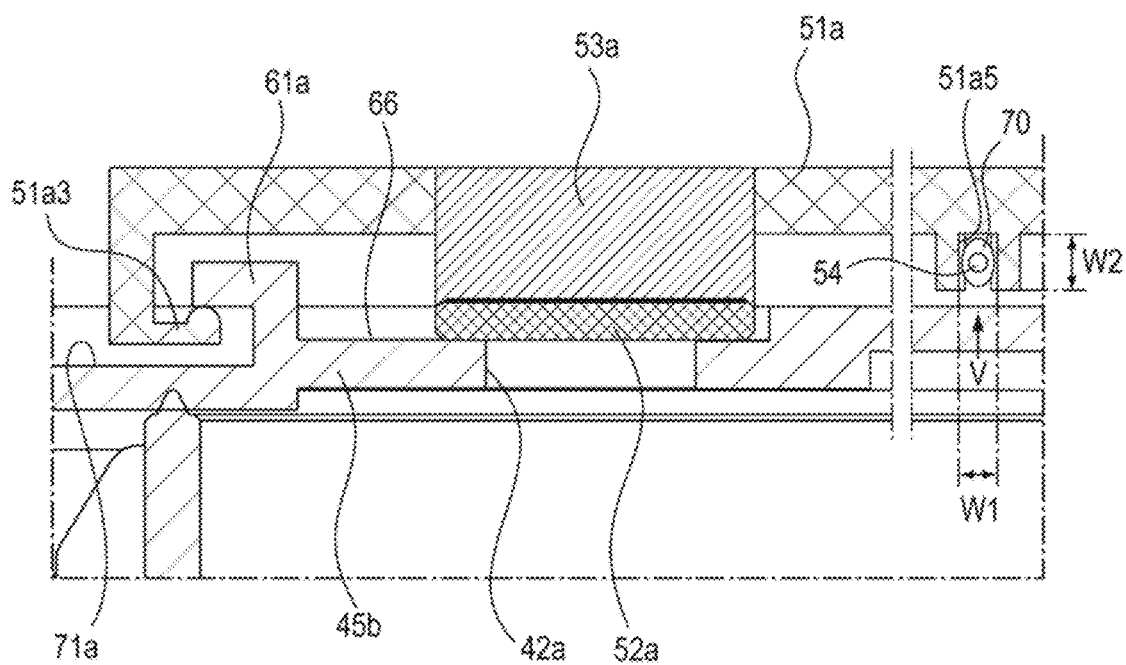
FIG. 5 is a cross-sectional view of a cleaning holder.
Figure 6:
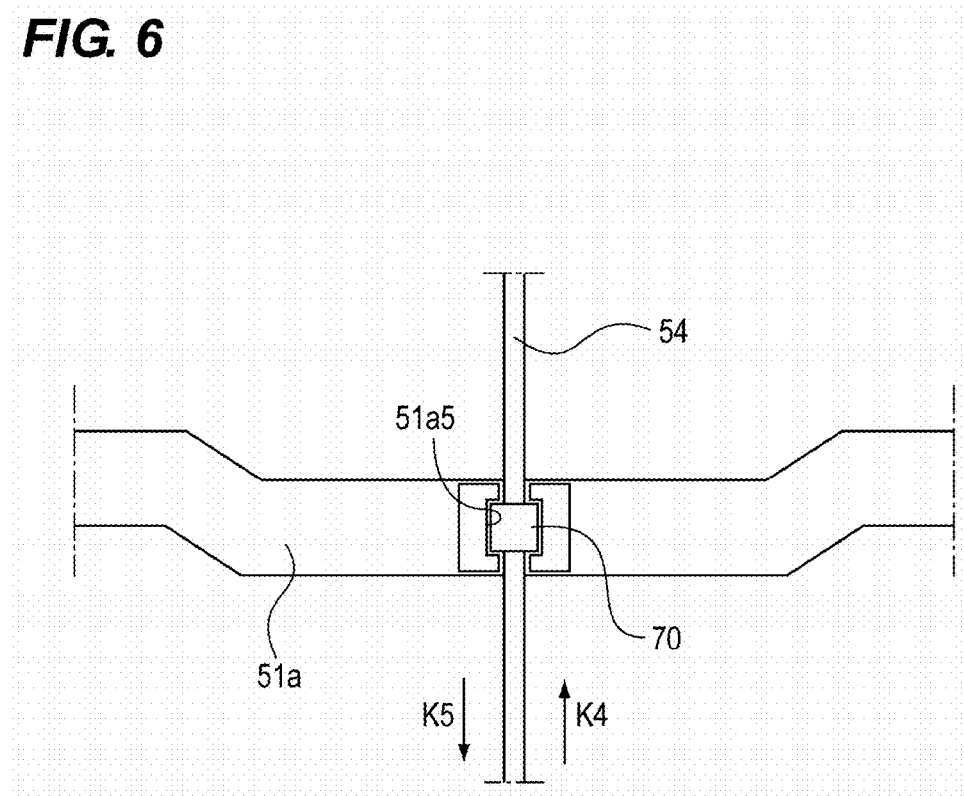
FIG. 6 is a cross-sectional view of a cleaning holder.
Figure 7:
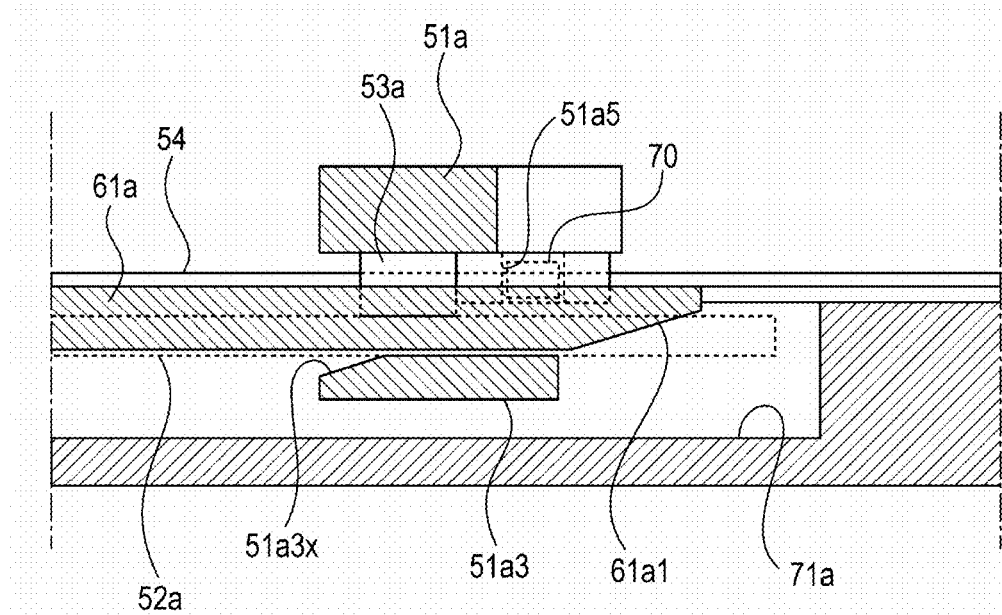
FIG. 7 is a view of the cleaning holder and the connecting member as seen from the direction of arrow V indicated in FIG. 5.

FIG. 4 is an enlarged perspective view of the periphery of the cleaning holder 51a. FIG. 5 is a cross-sectional view of the cleaning member 53 and the cleaning holder 51a taken along the line XX shown in FIG. 4. FIG. 6 is a cross-sectional view of the cleaning holder 51a taken along the line YY in FIG. 3. FIG. 7 is a view of the cleaning holder 51a and the connecting member 70 as seen from the direction of arrow V indicated in FIG. 5. Although the cleaning holder 51a will be described below, the cleaning holder 51b has the same shape.

As shown in FIGS. 4 to 7, the cleaning holder 51a includes the engaging portions 51a3 and 51a4 that respectively extend from the end portion in the longitudinal direction toward the central portion and respectively engage with the guide rails 61a and 61b such that the engaging portions 51a3 and 51a4 are respectively hooked by the guide rails 61a and 61b. That is, the engaging portion 51a3 (first engaging portion) on one end side in the longitudinal direction of the cleaning holder 51a engages with the guide rail 61a (first guide portion), and the engaging portion 51a4 (second engaging portion) on the other end side engages with the guide rail 61b (second guide portion).

Further, the groove 71a (first groove portion) is formed the cover 45b below the guide rail 61a so as to extend in the longitudinal direction of the transmission member 52 and through which the engaging portion 51a3 passes when the cleaning holder 51a moves. Similarly, the groove 71b (second groove portion) is formed the cover 45b below the guide rail 61b so as to extend in the longitudinal direction of the transmission member 52 and through which the engaging portion 51a4 passes. The longitudinal lengths of the grooves 71a and 71b are longer than those of the guide rails 61a and 61b.

Further, the guide rail 61a has the inclined portion 61a1 that is inclined such that the contact position with the engaging portion 51a3 is shifted upward from a predetermined position in the longitudinal direction toward the end portion. Similarly, the guide rail 61b has an inclined portion (not shown in figures) that is inclined such that the contact position with the engaging portion 51a4 is shifted upward from a predetermined position in the longitudinal direction toward the end portion.

Further, the engaging portion 51a3 of the cleaning holder 51a has the inclined portion 51a3x (another inclined portion) that is inclined so as to correspond to the inclined portion 61a1 of the guide rail 61a. Similarly, the engaging portion 51a4 of the cleaning holder 51a has an inclined portion (not shown in figures) that is inclined so as to correspond to the inclined portion (not shown in figures) of the guide rail 61b.

The cylindrical connecting member 70 is attached to the wire 54. The wire 54 is inserted into the cylinder of the connecting member 70. The connecting member 70 is fitted into the fitting hole 51a5 provided in the cleaning holder 51a. As a result, the wire 54 and the cleaning holder 51a are connected, and the cleaning holder 51a moves as the wire 54 moves. In addition, by setting the relationship between the lengths W1 and W2 shown in FIG. 5 to be W2>W1, the wire 54 becomes hard to be twisted.

Figure 8:
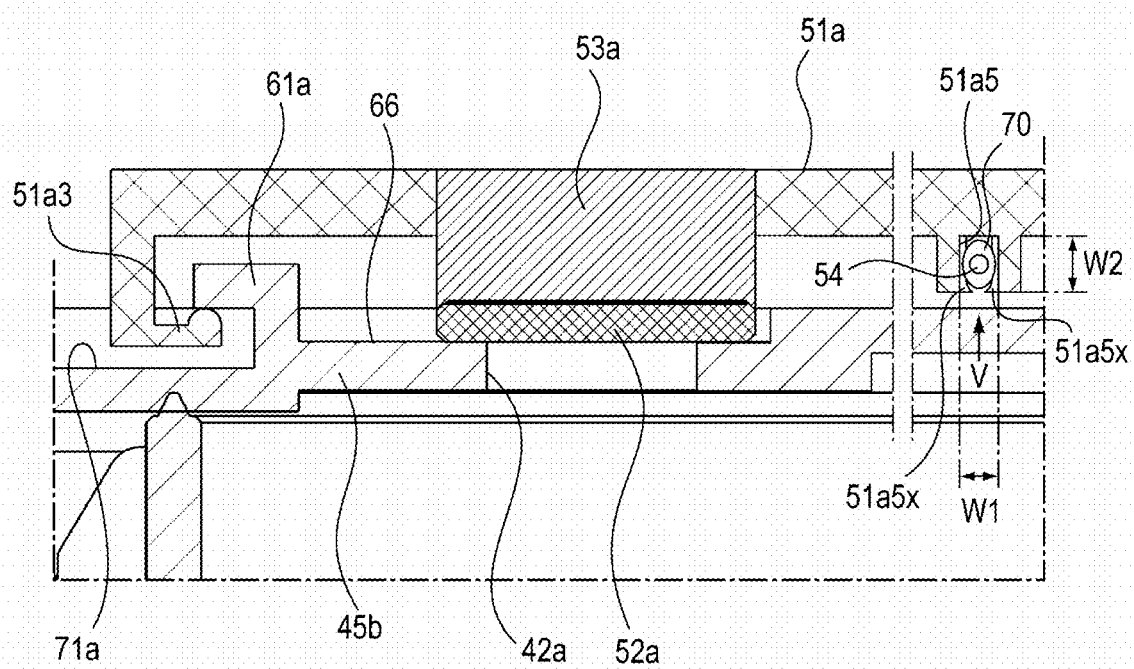
FIG. 8 is a view showing another configuration of the cleaning holder.

In addition, as shown in FIG. 8, the snap-fit portion 51a5x may be provided on the fitting hole 51a5 of the cleaning holder 51a. As a result, the connecting member 70 becomes hard to come out of the fitting hole 51a5.

<Cleaning Mode>

Next, a cleaning mode for cleaning the surface of the transmissive member 52 will be described.

The cleaning mode is executed when a user operates an input device (not shown) such as a touch panel when the image forming apparatus A is in a maintenance state. In addition, the cleaning mode is executed in response to the fact that the number of formed images has reached a predetermined number since the previous cleaning operation. In addition, the execution timing of the cleaning mode is not limited to this and a different timing may be adopted.

When the cleaning mode is started, the motor 55 is first driven, and the wire 54 travels in the direction of the arrow K6 shown in FIG. 3. When the wire 54 travels, the cleaning holder 51a moves along the guide rail 61 in the direction of the arrow K4 shown in FIG. 3, and the cleaning holder 51b moves along the guide rail 61 in the direction of the arrow K5 shown in FIG. 3. With this movement, the four cleaning members 53 move while contacting the corresponding surfaces of the four transmissive members 52, respectively. With this movement, foreign matters on the transmissive members 52 are scraped off and removed from the transmissive members 52.

Thereafter, when a predetermined time elapses, the motor 55 starts a reverse rotation, and the wire 54 starts to travel in the reverse direction (the direction of the arrow K7 shown in FIG. 3). Thereafter, when a predetermined time elapses, the motor 55 is stopped and the cleaning mode ends. Thus, in this embodiment, every time the cleaning mode is executed, the cleaning member 53 is reciprocated once along the longitudinal direction of the transmissive members 52.

<Attachment and Detachment of the Cleaning Holder>

Next, attachment and detachment of the cleaning holder 51 will be described.

Figure 9A:
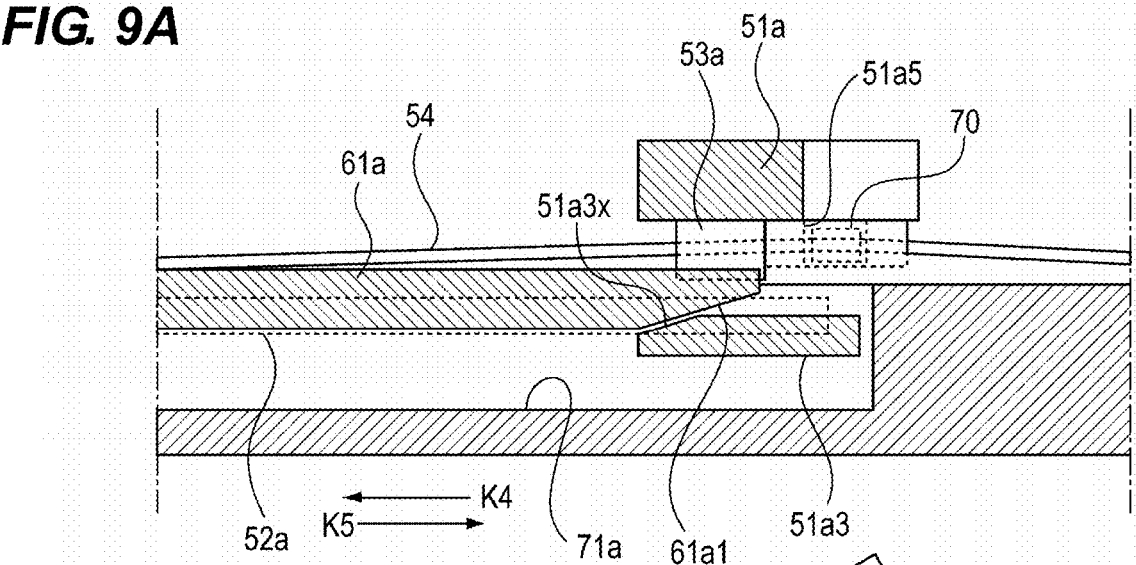
FIGS. 9A, 9B and 9C are schematic views sequentially showing how the cleaning holder is removed.
Figure 9B:
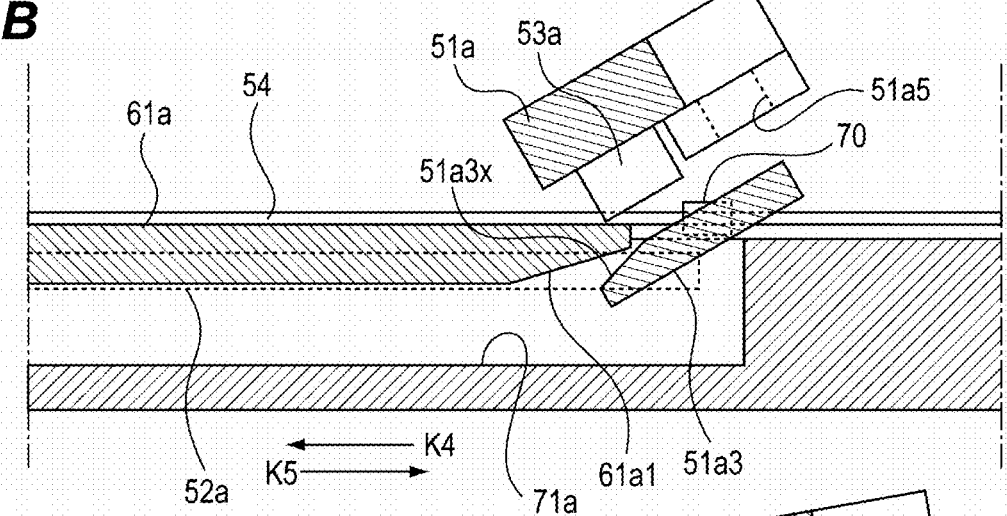
Figure 9C:
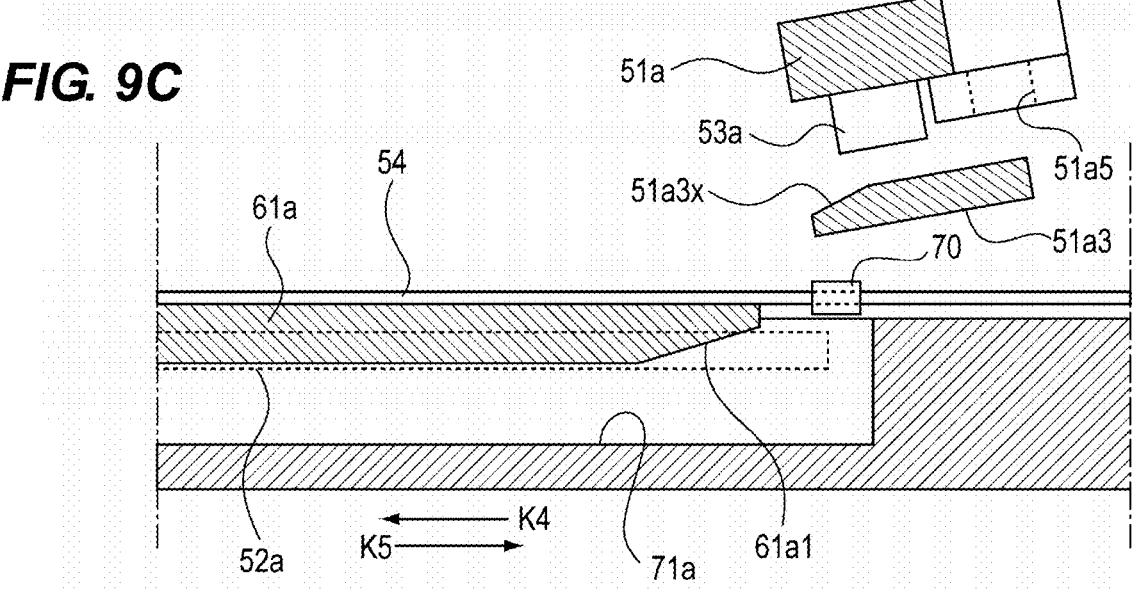

FIGS. 9A, 9B and 9C are schematic views sequentially illustrating how the cleaning holder 51a is removed. In the following, the attachment and detachment of only the cleaning holder 51a will be described since those of the cleaning holder 51b are similarly performed.

As shown in FIG. 9A, when the cleaning mode is completed, the cleaning holder 51a is moved to the side of the longitudinal ends of the guide rails 61a and 61b by the driving force of the motor 55. As described above, since the length in the longitudinal direction of the grooves 71a and 71b is longer than the length in the longitudinal direction of the guide rails 61a and 61b, the engagement between the engaging portions 51a3 and 51a4 of the cleaning holder 51a, and the guide rails 61a and 61b are partially released. In the present embodiment, although the cleaning holder 51a is moved by the driving force of the motor 55, the configuration may be adopted in which a maintenance worker may move the cleaning holder 51a manually.

As described above, the engagement between the engaging portions 51a3 and 51a4 of the cleaning holder 51a, and the guide rails 61a and 61b are partially released, so that the restriction on the upward movement of the cleaning holder 51a by the guide rails 61a and 61b is released. Further, at this stage, the cleaning member 53 that has been elastically deformed by being pressed against the transmissive member 52 is restored, and the cleaning holder 51 is slightly moved upward accordingly.

From this state, as shown in FIG. 9B, the worker moves the cleaning holder 51a toward the central side in the longitudinal direction of the guide rails 61a and 61b and in the opposite direction (the direction of the arrow K5) while holding the cleaning holder 51a and lifting it upward. As a result, the engaging portions 51a3 and 51a4 of the cleaning holder 51a move in the direction of the arrow K5 while passing in the grooves 71a and 71b, and the engagement between the engaging portions 51a3 and 51a4, and the guide rails 61a and 61b is completely released. That is, the lengths in the longitudinal direction of the guide rails 61a and 61b, and the grooves 71a and 71b are set such that the worker may move the cleaning holder 51a manually to pull out the cleaning holder 51a. At this time, the worker removes the connecting member 70 from the fitting hole 51a5 of the cleaning holder 51a.

As a result, as shown in FIG. 9C, the cleaning holder 51a is removed from the guide rails 61a and 61b. In the above-described manner, the worker may remove the cleaning holder 51a from the cover 45b. In addition, when attaching the cleaning holder 51a, a worker performs a reverse operation to the above-described operation for removing the cleaning holder 51a.

In addition, when the cleaning holder 51a is not removed after the cleaning mode ends, the cleaning holder 51a is moved again at the position where the engaging portions 51a3 and 51a4 and the guide rails 61a and 61b are engaged (the position indicated in FIG. 7) at the start of the next cleaning mode. Thereafter, the cleaning mode is performed.

In this way, the cleaning holder 51a is moved from the longitudinal ends of the guide rails 61a and 61b in the direction of the arrow K5 and the engaging portions 51a3 and 51a4 pass in the groove portions 71a and 71b, so that the engagement between the engaging portions 51a3 and 51a4, and the guide rails 61a and 61b is released. As a result, the cleaning holder 51a becomes easy to remove, and the exchangeability of the cleaning holder 51a and the cleaning members 53a and 53b can be improved.

Further, by providing the guide rails 61a and 61b with the inclined portion 61a1 and the inclined portion (not shown in figures), the cleaning holder 51a becomes easy to remove when the cleaning holder 51a is slide in the arrow K5 direction from the longitudinal ends of the guide rails 61a and 61b. Further, when the cleaning holder 51a is slide in the direction of the arrow K4 from the longitudinal ends of the guide rails 61a and 61b, the cleaning holder 51a is easy to attach. Furthermore, by providing the engaging portions 51a3 and 51a4 of the cleaning holder 51a with the inclined portions 51a3x and the inclined portions (not shown), the cleaning holder 51a becomes much easier to attach and detach.

In the present embodiment, the configuration has been described in which the cleaning holder 51a is removed while being lifted upward. However, the configuration may be adopted in which when the groove portions 71a and 71b may be further lengthened, so that, the engagement between the guide rails 61a and 61a, and the engaging portions 51a3 and 51a4 are released when the cleaning holder 51a is merely moved from the longitudinal ends of the guide rails 61a and 61b in the direction of the arrow K5.

Figure 10:
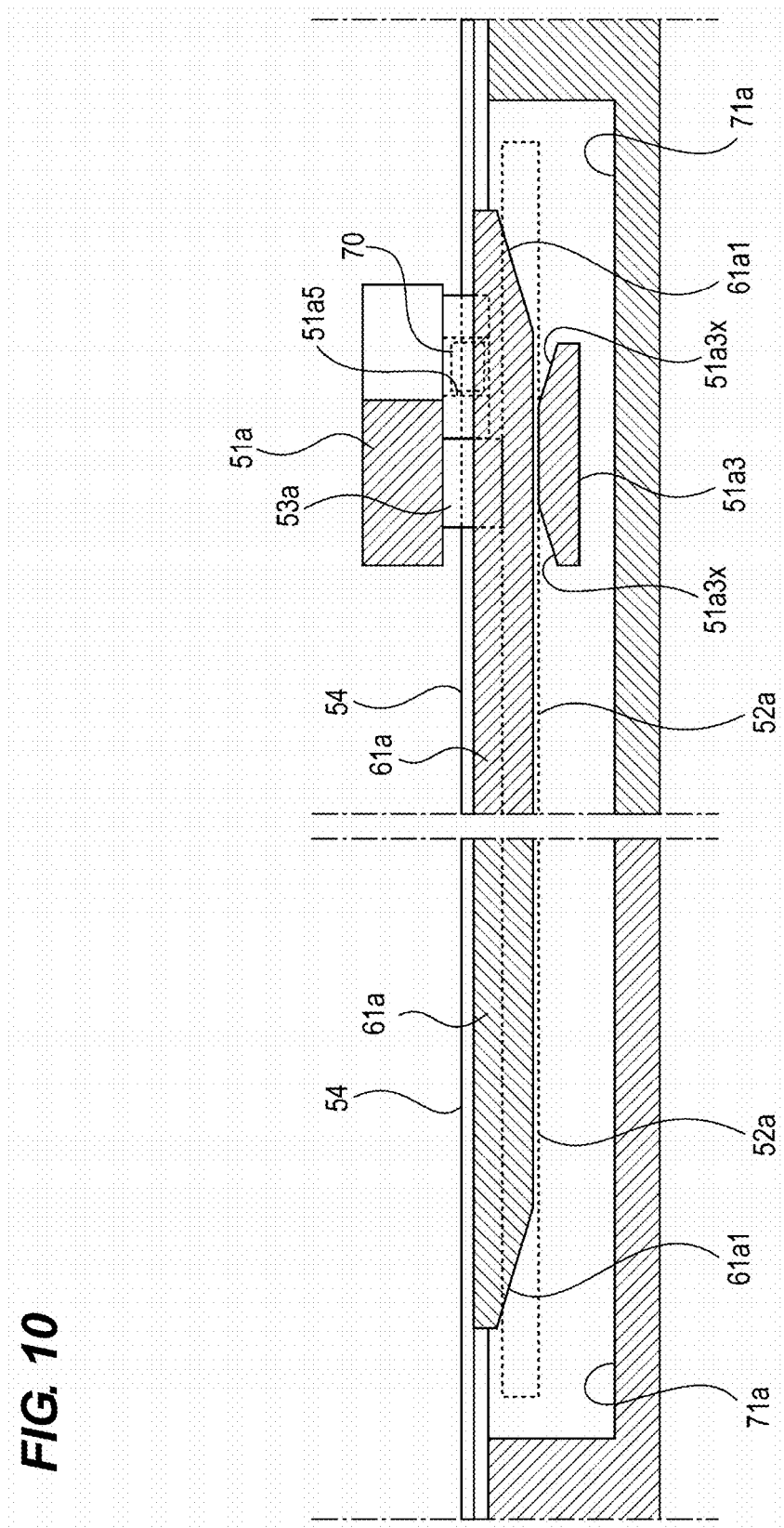
FIG. 10 is a diagram showing another configuration of the optical scanning device.

Moreover, although in this embodiment, the configuration has been described in which the cleaning holder 51 reciprocates in cleaning mode, the configuration may be adopted in which the cleaning holder 51 is stopped by one-way movement. In this case, as shown in FIG. 10, the lengths of both ends in the longitudinal direction of the groove 71 are set larger than those of both ends in the longitudinal direction of the guide rail 61. Further, inclined portions 61a1 are provided at both ends in the longitudinal direction of the guide rail 61, and inclined portions 51a3x are provided at both ends of the engaging portions 51a3 and 51a4 of the cleaning holder 51a. As a result, the exchangeability of the cleaning holder 51 and the cleaning member 53 may be further improved similarly to the above.

Second Embodiment

Next, the configuration of the image forming apparatus according to the second embodiment of the present invention will be described. The same parts as those in the first embodiment will be denoted by the same reference numerals and the description thereof will be omitted.

Figure 11:
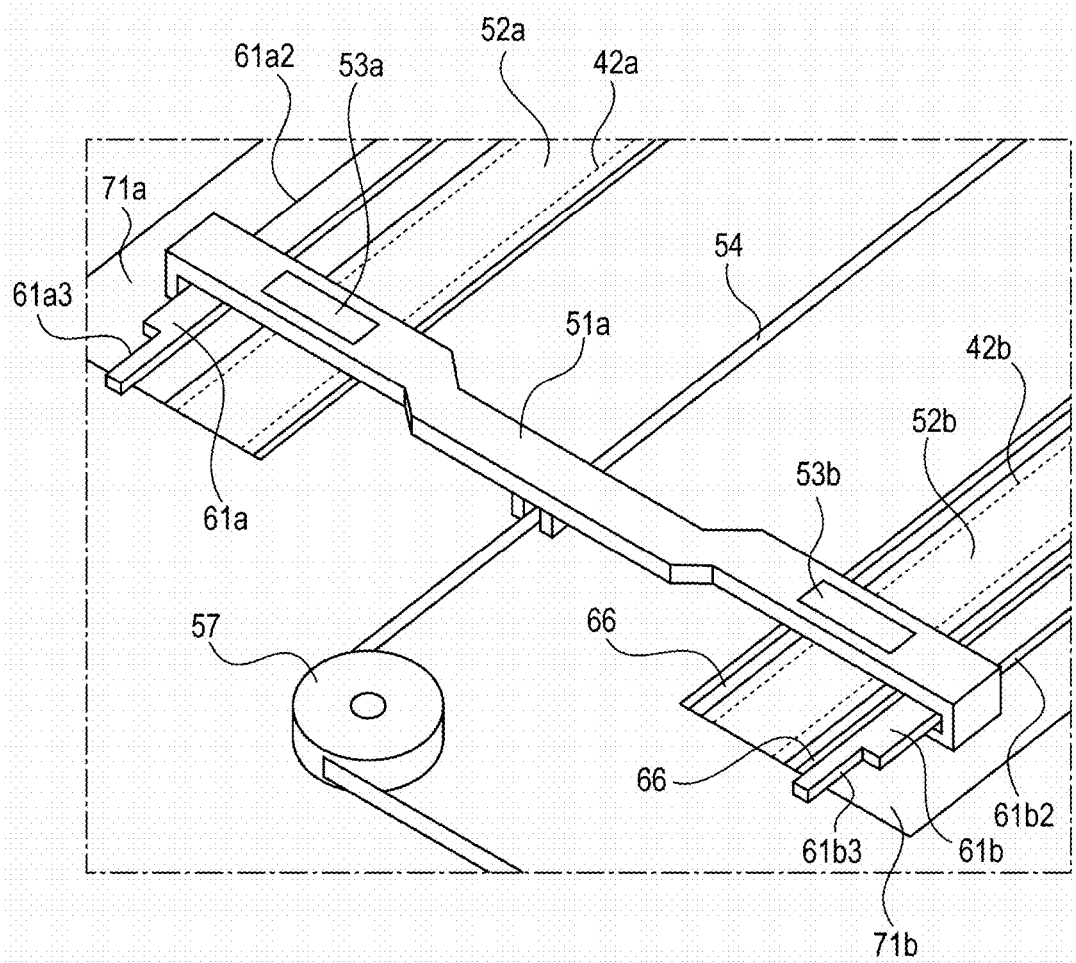
FIG. 11 is an enlarged perspective view of the periphery of the cleaning holder.

FIG. 11 is an enlarged perspective view of the periphery of the cleaning holder 51a according to the present embodiment. In the following, only the cleaning holder 51a and the guide rails 61a and 61b will be described since the cleaning holder 51b and the guide rails 61c and 61d have the same shape.

As shown in FIG. 11, in the present embodiment, the recessed portions 61a3 and 61b3 (first recessed portion and second recessed portion) that are recessed in the widthwise direction are provided at the end portions of the guide rails 61a and 61b in the longitudinal direction. That is, the guide rails 61a and 61b respectively include the recessed portions 61a3 and 61b3 and the wide portions 61a2 and 61b2 that are provided adjacent to the recessed portions 61a3 and 61b3 in the longitudinal direction. The wide portions 61a2 and 61b2 are wider in the widthwise direction than the recessed portions 61a3 and 61b3. The lengths of the guide rails 61a and 61b in the longitudinal direction are longer than those of the groove portions 71a and 71b. Other configurations are the same as those of the first embodiment.

Figure 12A:
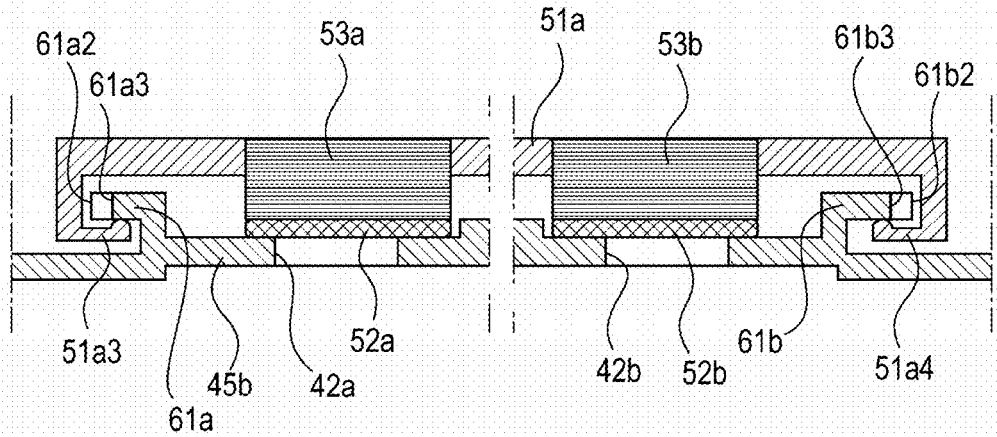
FIGS. 12A, 12B and 12C are cross-sectional views sequentially showing how the cleaning holder is removed.
Figure 12B:
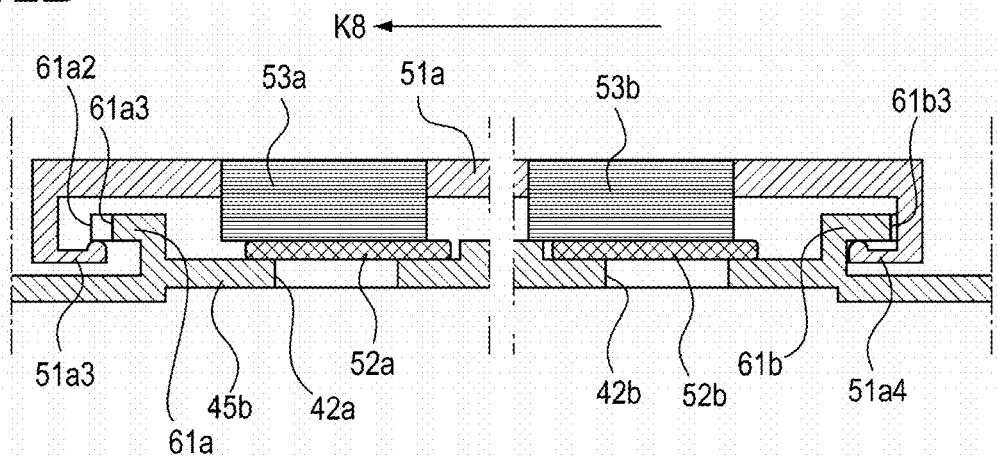
Figure 12C:
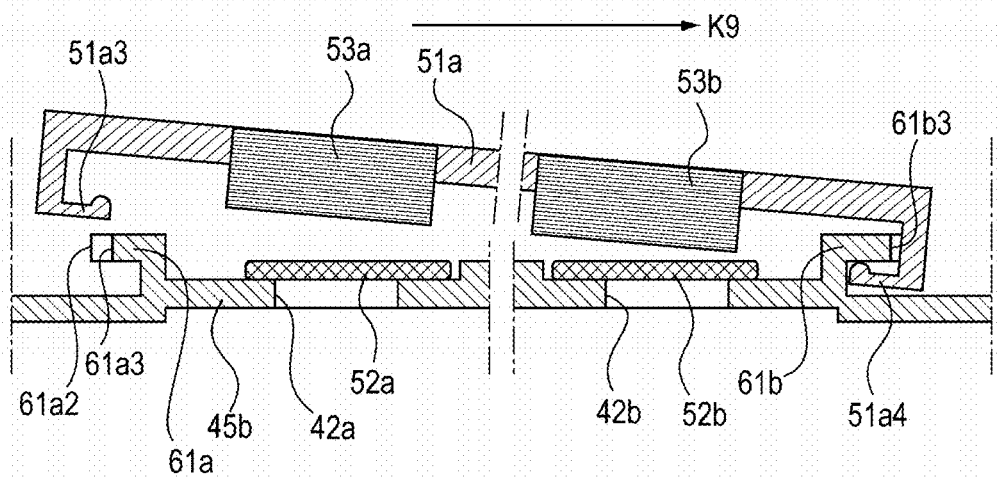

FIGS. 12A, 12B and 12C are cross-sectional views of the cleaning holder 51a, and sequentially show the states of removing the cleaning holder 51a. As shown in FIG. 12A, when removing the cleaning holder 51a from the guide rails 61a and 61b, a worker first positions the cleaning holder 51a manually at the positions of the recessed portions 61a3 and 61b3 of the guide rails 61a and 61b. Thus, by positioning the cleaning holder 51a at the positions of the recessed portions 61a3 and 61b3, the recessed portions 61a3 and 61b3 serve as a space for the cleaning holder 51a to move in the longitudinal direction of the cleaning holder 51a. In the present embodiment, the cleaning holder 51a is manually moved to the above position, but may be moved by the driving force of the motor 55.

Next, as shown in FIG. 12B, the worker pushes the right side of the cleaning holder 51a in FIG. 12B by hand to slide the cleaning holder 51a in the direction of the arrow K8, which is its longitudinal direction. As a result, the engaging portion 51a3 moves to the left, and the engagement between the engaging portion 51a3 and the guide rail 61a is released.

Next, as shown in FIG. 12C, the worker pulls upward the side of the engaging portion 51a3 whose engagement with the cleaning holder 51a has been released. As a result, the cleaning holder 51a is removed from the guide rail 61a. Thereafter, the worker pushes the left side of the cleaning holder 51a by hand to slide the cleaning holder 51a in the direction of the arrow K9, which is its longitudinal direction. As a result, the engaging portion 51a4 moves to the right, the engagement between the engaging portion 51a4 and the guide rail 61b is released, and the cleaning holder 51a is removed from the guide rail 61b.

Further, the worker removes the connecting member 70 from the fitting hole 51a5 of the cleaning holder 51a. As a result, the cleaning holder 51a can be removed from the cover 45b. In addition, when attaching the cleaning holder 51a, the worker performs a reverse operation to the above-described operation for removing the cleaning holder 51a.

By providing the guide rails 61a and 61b with the recessed portions 61a3 and 61b3 as described above, the cleaning holder 51a can be easily removed, and the exchangeability of the cleaning holder 51a and the cleaning members 53a and 53b can be improved.

In addition, in this embodiment, although recessed portions 61a3, 61b3 are provided in the end portions in the longitudinal direction of guide rails 61a and 61b, this invention is not limited to this. Namely, if when the recessed portions 61a3 and 61b3 are provided at other positions in the longitudinal direction of the guide rails 61a and 61b, the same effect as described above can be obtained.

In the first and second embodiments, the configurations in which four transmission members 52 are respectively provided for the four irradiation openings 42 have been described, but the present invention is not limited to this. That is, as long as their functions can be performed, the number of the irradiation portions 42 and the number of the transmissive members 52 are arbitrary, and the same effect as described above can be obtained even with the configuration with other numbers of the irradiation portions and the transmissive members.

Figure 13:
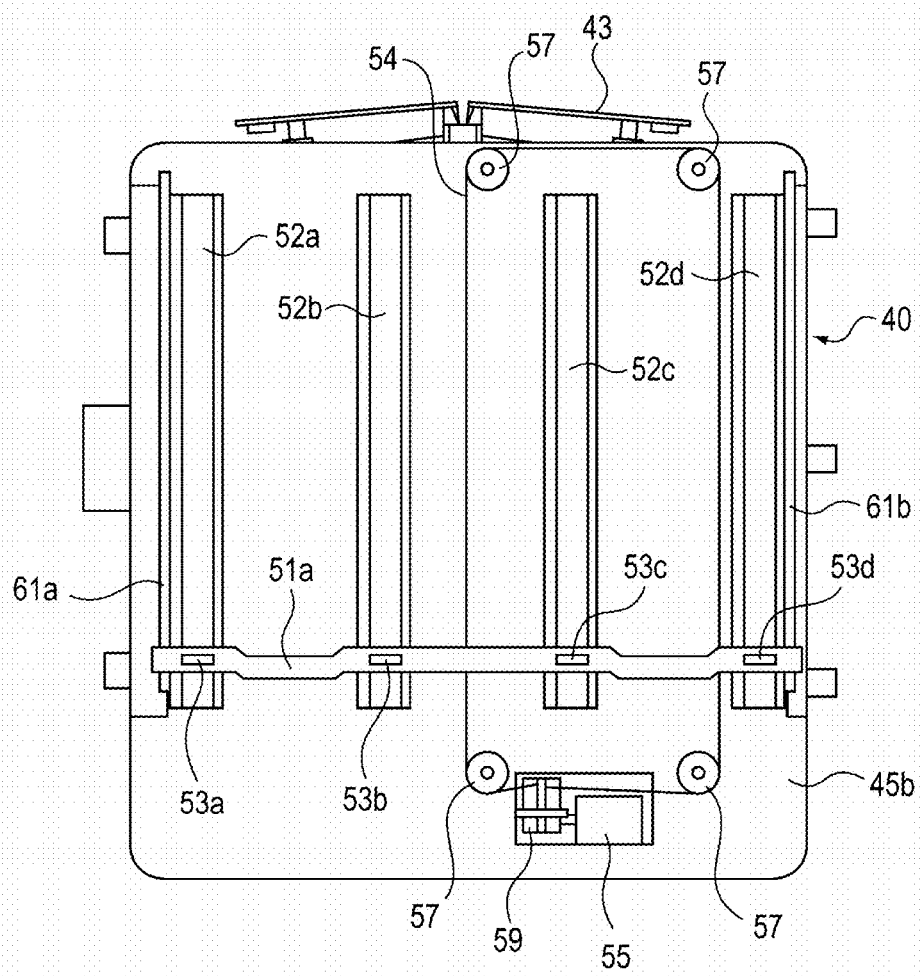
FIG. 13 is a view showing another configuration of the cleaning holder.

In the first and second embodiments, the configurations in which the two cleaning members 53 are held by the single cleaning holder 51a or 51b have been described. However, the present invention is not limited to this. Namely, as shown in FIG. 13, the four cleaning members 53 may be held by the single cleaning holder 51a.

In this case, for example, the cleaning holder 51a is engaged with the guide rails 61a and 61b provided respectively at positions closer to the end portions of the cleaning holder 51a than those of the transmissive members 52b and 52c. Further, the cleaning holder 51a is connected to the wire 54 at a position between the transmissive members 52b and 52c. With this configuration, the replacement of the cleaning member 53 is completed by replacing only the single cleaning holder 51a. Therefore, the exchangeability of the cleaning member 53 can be improved. Further, the manufacturing cost can be reduced by reducing the number of parts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-227618, filed Dec. 4, 2018, which is hereby incorporated by reference herein in its entirety.

What is claimed is:
1. An image forming apparatus, comprising:
a first photosensitive body;
a second photosensitive body;
a first developing portion configured to develop an electrostatic latent image formed on the first photosensitive body with toner;
a second developing portion configured to develop an electrostatic latent image formed on the second photosensitive body with toner; and
an optical scanning device disposed below the first photosensitive body, the second photosensitive body, the first developing portion and the second developing portion in a vertical direction,
wherein the optical scanning device comprises:
a rotary polygon mirror configured to deflect a first laser beam and a second laser beam such that the first laser beam scans the first photosensitive body and second laser beam scans the second photosensitive body;

a housing in which the rotary polygon mirror is accommodated, a first opening portion through which the first laser beam passes from an inside of the housing to an outside of the housing and a second opening portion through which the second laser beam passes from the inside of the housing to the outside of the housing being formed on the housing, the first opening portion being configured to be long in a scanning direction of the first laser beam, the second opening portion being configured to be long in a scanning direction of the second laser beam;

a first transmissive member through which the first laser beam transmits, the first transmissive member being configured to close the first opening portion;

a second transmissive member through which the second laser beam transmits, the second transmissive member being configured to close the second opening portion;

a first cleaning member configured to be in contact with a surface of the first transmissive member which surface faces the outside of the housing in order to clean the surface of the first transmissive member;

a second cleaning member configured to be in contact with a surface of the second transmissive member which surface faces the outside of the housing in order to clean the surface of the second transmissive member;

a holding member configured to integrally hold the first cleaning member and the second cleaning member;

a moving unit configured to move the holding member such that the first cleaning member and the second cleaning member move in a first direction that is a longitudinal direction of the first transmissive member and the second transmissive member;

a first guide portion configured to guide a movement of the holding member, the first guide portion extending in the first direction, a first engaging portion provided on an end portion side of the holding member in a second direction that crosses the first direction and the vertical direction being configured to engage with the first guide portion;

a second guide portion configured to guide a movement of the holding member, the second guide portion extending in the first direction, a second engaging portion provided on another end portion side of the holding member in the second direction being configured to engage with the second guide portion;

a first groove portion in which the first engaging portion passes when the holding member moves, the first groove portion being provided below the first guide portion and extending in the first direction, a length of the first groove portion being larger than that of the first guide portion in the first direction;

a second groove portion in which the second engaging portion passes when the holding member moves, the second groove portion being provided below the second guide portion and extending in the first direction, a length of the second groove portion being larger than that of the second guide portion in the first direction, and wherein when the holding member moves from end portions of the first guide portion and the second guide portion in the first direction to an opposite side with respect to a central portion side in the first direction and the first engaging portion and the second engaging portion respectively pass in the first groove portion and the second groove portion, engagements of the first engaging portion and the second engaging portion with the first guide portion and the second guide portion are released.

2. The image forming apparatus according to claim 1, wherein the first guide portion and the second guide portion respectively include an inclined portion that is inclined such that a contact position where the first guide portion and the second guide portion are in contact with the first engaging portion and second engaging portion is shifted upward from a predetermined position in the first direction toward the end portions.

3. The image forming apparatus according to claim 2, wherein the first engaging portion and the second engaging portion of the holding member respectively include another inclined portion that is inclined so as to correspond to the inclined portion of the first guide portion and the second guide portion.

4. An image forming apparatus, comprising:
a first photosensitive body;
a second photosensitive body;
a first developing portion configured to develop an electrostatic latent image formed on the first photosensitive body with toner;
a second developing portion configured to develop an electrostatic latent image formed on the second photosensitive body with toner; and
an optical scanning device disposed below the first photosensitive body, the second photosensitive body, the first developing portion and the second developing portion in a vertical direction,
wherein the optical scanning device comprises:
a rotary polygon mirror configured to deflect a first laser beam and a second laser beam such that the first laser beam scans the first photosensitive body and second laser beam scans the second photosensitive body;

a housing in which the rotary polygon mirror is accommodated, a first opening portion through which the first laser beam passes from an inside of the housing to an outside of the housing and a second opening portion through which the second laser beam passes from the inside of the housing to the outside of the housing being formed on the housing, the first opening portion being configured to be long in a scanning direction of the first laser beam, the second opening portion being configured to be long in a scanning direction of the second laser beam;

a first transmissive member through which the first laser beam transmits, the first transmissive member being configured to close the first opening portion;

a second transmissive member through which the second laser beam transmits, the second transmissive member being configured to close the second opening portion;

a first cleaning member configured to be in contact with a surface of the first transmissive member which surface faces the outside of the housing in order to clean the surface of the first transmissive member;

a second cleaning member configured to be in contact with a surface of the second transmissive member which surface faces the outside of the housing in order to clean the surface of the second transmissive member;

a holding member configured to integrally hold the first cleaning member and the second cleaning member;

a moving unit configured to move the holding member such that the first cleaning member and the second cleaning member move in a first direction that is a longitudinal direction of the first transmissive member and the second transmissive member;

a first guide portion configured to guide a movement of the holding member, the first guide portion extending in the first direction, a first engaging portion provided on an end portion side of the holding member in a second direction that crosses the first direction and the vertical direction being configured to engage with the first guide portion, the first guide portion having a first recessed portion at a position in the first direction, the first recessed portion being recessed in the second direction;

a second guide portion configured to guide a movement of the holding member, the second guide portion extending in the first direction, a second engaging portion provided on another end portion side of the holding member in the second direction being configured to engage with the second guide portion, the second guide portion having a second recessed portion at a position corresponding to that of the first recessed portion in the first direction, the second recessed portion being recessed in the second direction, wherein the first engaging portion and the second engaging portion respectively extend from end portion sides to a central portion side in the second direction and respectively engage with the first guide portion and the second guide portion such that the first engaging portion and the second engaging portion are respectively hooked by the first guide portion and the second guide portion when the first engaging portion and the second engaging portion are moved along the second direction, and wherein when the holding member is moved in the second direction at the positions of the first recessed portion and the second recessed portion, engagements of the first engaging portion and the second engaging portion with the first guide portion and the second guide portion are released.

5. The image forming apparatus according to claim 4, wherein the first recessed portion and the second recessed portion are respectively provided at end portions of the first guide portion and the second guide portion in the first direction.

6. The image forming apparatus according to claim 4, wherein widths of the first recessed portion and the second recessed portion in the first direction are larger than the width of the holding member in the first direction.

* * * * *